Patented Oct. 27, 1953

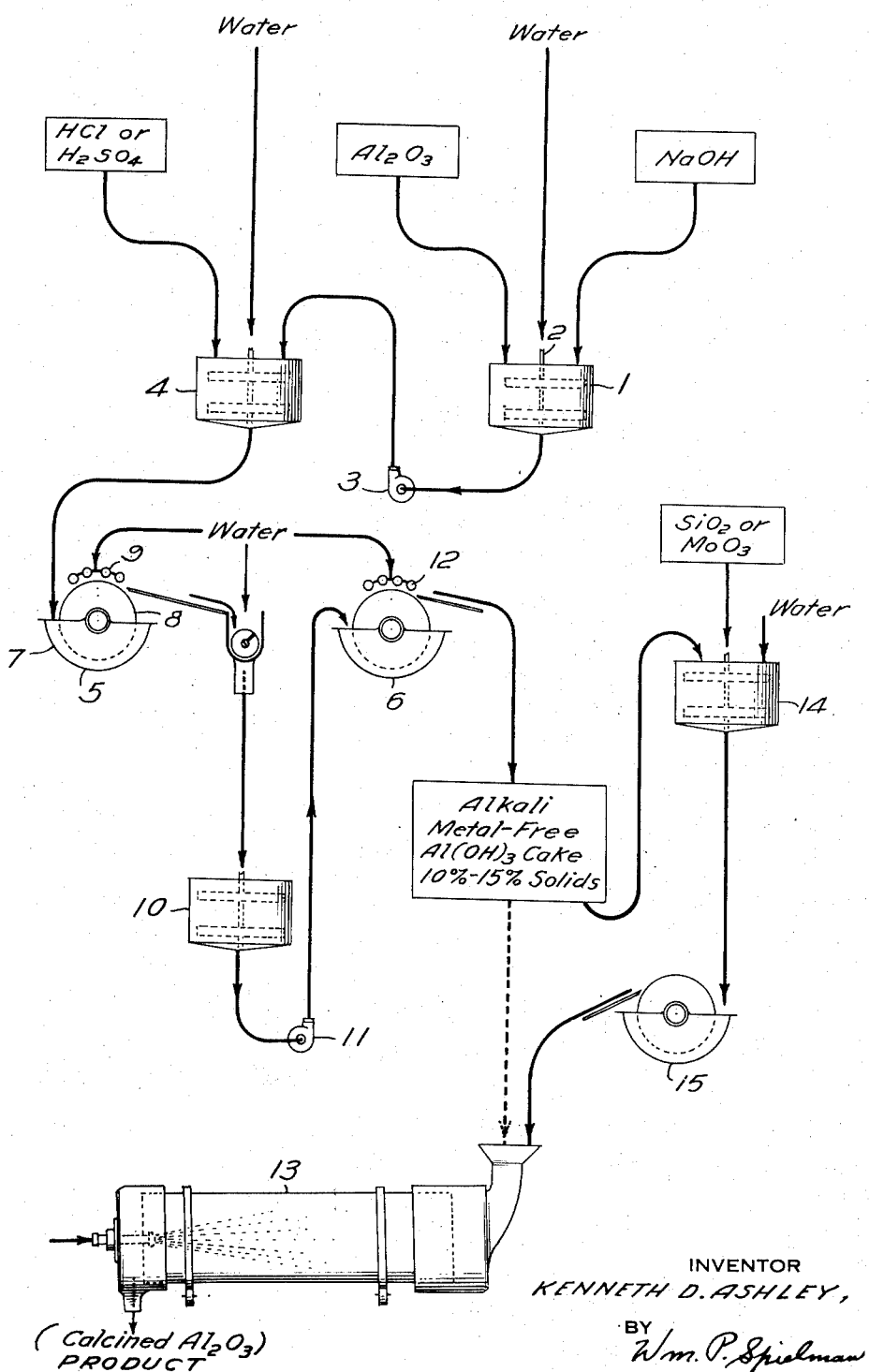

2,657,115

UNITED STATES PATENT OFFICE 2,657,115

MANUFACTURE OF ALKALI METAL-FREE ALUMINA

Kenneth D. Ashley, Stamford, Conn., assignor to American Cyanamid Company, New York, N. Y., a corporation of Maine Application March 10, 1950, Serial No. 148,978

5 Claims. (Cl. 23—143)

This invention relates to a method for the production of aluminum hydroxide having a high degree of purity and particularly a low content of alkali metal salts. The alkali metal-free aluminum hydroxide prepared by the method of the invention can of course be used for a wide variety of purposes, but it is of particular value in the manufacture of petroleum cracking catalysts and petroleum hydroforming catalysts wherein the presence of alkali metal compounds is extremely undesirable.

Heretofore alkali metal-free aluminum hydroxides having the necessary surface area for catalytic purposes have been prepared from aluminum salts such as aluminum chloride, aluminum sulfate and the like. These salts are, in turn, prepared from commercially pure aluminum hydrate, which is obtained from bauxite by the Bayer process. In this process dried bauxite is digested with hot sodium hydroxide solution and the resulting sodium aluminate solution is diluted and cooled in order to separate out a crystalline aluminum hydroxide.

The alumina obtained from the Bayer process is crystalline in form and is therefore not sufficiently active for catalytic purposes. A more highly active alumina is obtainable by precipitating aluminum hydroxide from aluminum sulfate solutions by the addition of ammonium hydroxide; however, the aluminum hydroxide precipitated by this method is extremely gelatinous and quickly blinds the cloth of a filter. This makes it impossible to wash the filter cake free from impurities such as alkali metal salts.

The present invention is based on the discovery that aluminum hydroxide having a consistency such that it can be filtered and washed is obtainable from alkali metal aluminate solutions by a controlled precipitation method. I have found that an aluminum hydroxide precipitate having good filtration properties is obtained when an alkali metal aluminate solution is reacted with a mineral acid under conditions such that the pH is maintained between about 5.8 and 8.3. If the pH of the aluminum hydroxide slurry is much below 5.8 slimes are formed which quickly blind the filter cloth and make washing impossible. If the pH is much above 8.3 it is not possible to wash out the water-soluble alkali metal compounds to the necessary extent. Accordingly, the present invention consists essentially in the precipitation of aluminum hydroxide from aqueous alkali metal aluminate solutions by reaction thereof with mineral acids under these particular pH conditions.

The invention will be described in greater detail with reference to the accompanying drawing, the single figure of which is a flow sheet illustrating a specific embodiment thereof. Referring to this drawing it will be seen that aluminum oxide or hydroxide, such as bauxite or commercial aluminum hydroxide, may be digested with an alkali metal hydroxide and with water in the digestion tank 1. This tank is preferably provided with steam coils and with an agitator 2. The digestion is usually carried out at temperatures of about 90–120° C. using concentrated solutions such as 40–60% solutions of sodium or potassium hydroxide. Preferably an excess of about 5% to 20% of the alkali is used over the amount theoretically necessary to react with all the alumina. Where bauxites containing siliceous impurities and iron oxide are employed it is desirable to limit the excess of caustic to 10% in order not to dissolve the silica. The digestion liquor is diluted to 15–30% $Al_2O_3$ content at the end of the digestion period and clarified by filtration or settling, or both.

The alkali metal aluminate solution prepared in the tank 1 and diluted to 15–30% $Al_2O_3$ content is transferred by the pump 3 into the tank 4 where it is reacted with a mineral acid to produce a precipitate of semi-gelatinous aluminum hydroxide. In accordance with the principles of the present invention this is accomplished while maintaining a pH within the tank 4 between about 5.8 and about 8.3 and preferably between 6.0 and 7.5. This is accomplished by introducing the alkali metal aluminate solution and the hydrochloric acid, or nitric acid or other mineral acid at suitable rates while maintaining the agitator in the tank 4 in continuous operation. Preferably a charge of water is first placed in the tank 4, and cooling coils may also be provided in this tank to absorb the excess heat of reaction. By this arrangement a relatively dilute suspension or slurry of hydrated alumina is first formed in the reaction tank; as additional quantities of reagents are added excessive concentration is avoided by further additions of water to the tank. The amount of water added is usually such as to maintain a hydrated alumina solids content of about 5–10%.

The reaction between the sodium aluminate or other alkali metal aluminate and the mineral acid in the tank 4 produces a slurry of aluminum hydroxide which is contaminated by the alkali metal salt of the mineral acid employed. The slurry is therefore filtered and washed on one or more continuous rotary filters. It has been found advantageous to use two filters 5 and 6, which are operated in series. The slurry introduced into the trough 7 of the filter 5 is picked up on a rotating drum 8 covered with a filter cloth and the resulting filter cake is washed with water by a series of sprays 9. As has been stated, it is a particular advantage of the present invention that aluminum hydroxide having good filtration characteristics is obtained by employing controlled precipitating conditions; when a pH of 6-7 is maintained in the tank 4 a porous filter cake of 0.5-1 inch thickness is easily obtainable on the filter 5. The sprays 9 are so adjusted that all of the aluminum hydroxide filter cake on the drum 8 is continuously wet by the wash water, so that there are no dry areas on the cake until the discharge side of the filter is reached. The wash water may be ordinary water, preferably having a low dissolved salts content, or water acidified to a pH of 3-5 may be employed.

The washed filter cake from the drum 8 is discharged into a repulper where it is made into a slurry with additional water and passed into a tank 10. In this tank its solids content is again adjusted to about 5-10%, and preferably about 7-8%, and the pH is adjusted to 5.5-7.5, after which it is discharged through a pump 11 to the second filter 6, where it is again filtered and washed. The filter 6 is a continuous rotary filter similar in construction and operation to the filter 5, and the wash water introduced through its sprays 12 is preferably sufficient in quantity to maintain the filter cake completely wet at all times. The quantity of wash water on each of the filters 5 and 6 is usually sufficient to give a double displacement wash; when this is done the content of alkali metal salts in the filter cake leaving the filter 6 is less than 0.1% and is usually on the order of 0.01%–0.03% expressed as $Me_2O$.

The purified aluminum hydroxide filter cake obtained from the filter 6 has a solids content of about 10-15%, and is particularly well suited for the manufacture of alumina gels of extremely high purity, such as those used for catalytic purposes. As is indicated in the drawing the filter cake may be passed directly into a drying and calcination kiln 13, which is preferably of the rotary type in which the aluminum hydroxide is passed in countercurrent contact with a stream of hot products of combustion. The calcined alumina obtained by this procedure may be used directly as a dehydration catalyst, or it may be employed as a catalyst carrier by impregnating or spray-coating with any desired catalytic material such as platinum, $V_2O_5$, calcium chloride and the like. Alternatively, the alkali metal-free aluminum hydroxide filter cake may be passed into a mixing tank 14 where it is mixed with an aqueous slurry of gelatinous silica for the production of a silica-alumina cracking catalyst. The resulting aqueous slurry of mixed silica-alumina, preferably having a solids content of about 4-6%, is dewatered on a continuous rotary filter 15 and the resulting filter cake is introduced into the kiln 13 for drying and calcination. Other catalytic metal oxides, such as the oxides of chromium, molybdenum or vanadium, may be mixed with the aluminum hydroxide in the tank 14 if desired. The resulting slurry may then be dewatered on the filter 15 and calcined in the kiln 16, and the catalyst so produced is well suited for the hydroforming of petroleum fractions in the presence of hydrogen containing gases. It is preferable, however, to add the promotors in soluble form to the filter cake from filter 6 in a mixer and dry directly. The soluble forms are preferably chromic acid, ammonium molybdate and ammonium metavanadate.

The invention will be further illustrated by the following specific examples to which, however, it is not limited.

*Example 1*

A concentrated sodium aluminate solution was produced by adding a commercial grade of aluminum hydroxide to a reaction vessel containing a 10% excess of 50% NaOH solution heated to 110° C. with vigorous agitation. The solution was diluted with hot water to a concentration corresponding to 25% $Al_2O_3$.

A charge of 300 lbs. of water was placed in a reaction vessel similar to the tank 4 shown on the attached drawing and the agitator was started. The above-described sodium aluminate solution was then introduced in a thin stream simultaneously with the introduction of a stream of 4.6 N hydrochloric acid until 240 lbs. of aluminate solution and 353 lbs. of acid had been reacted. By this procedure the pH of the slurry in the tank 2 was maintained between 6.0 and 7.0 so that a readily filterable precipitate of aluminum hydroxide was obtained.

Leaf tests on the resulting slurry showed that it could be filtered and washed readily and therefore it was dewatered and washed on a rotary vacuum filter having a drum 3 feet in diameter. When wash water made up as 0.01% HCl was used a product containing 0.03% of sodium salt, calculated as $Na_2O$, was obtained after two successive filtrations and washings.

*Example 2*

To a 45% aqueous sodium hydroxide solution at 100-117° C. there was added a commercial grade of bauxite ground to 10 mesh. The caustic was in 15% excess. Digestion was continued with agitation for 3 hours at the same temperature after which the solution was diluted to 10% $Al_2O_3$ and filtered.

The filtrate was cooled to 40° C. and added to a charge of water in an agitated reaction vessel along with a stream of 10% sulfuric acid solution. The rate of addition of the reagents was such as to maintain a pH between 6.3 and 7.5 during the precipitation, which lasted for 1 hour. Leaf tests on the resulting slurry showed, in a typical case, that 0.22 lb. of cake containing 12.2% solids was picked up in 30 seconds on a 0.1 sq. ft. leaf, and passed 13.7 displacements of wash water in a 5-minute period. The aluminum hydroxide precipitated by this method was therefore well suited for filtration and washing on a rotary vacuum filter.

*Example 3*

A sodium aluminate solution was prepared by reacting a hot 50% NaOH solution with a commercial grade of crystalline aluminum trihydrate containing the equivalent of 65% $Al_2O_3$. The reaction was carried out with a 10% excess of NaOH solution heated to 110° C. and with vigorous agitation. The resulting solution was diluted with hot water to a 13.8% $Al_2O_3$ content.

This solution was added simultaneously with an equivalent quantity of 18% $HNO_3$ solution to a quantity of water in a reaction vessel with vigorous agitation. The rate of introduction of the reagents was such that the pH in the vessel remained between 5.8 and 7.0. The resulting slurry filtered and washed readily. As an example, at a pH of 5.8, 0.35 lb. of cake containing 10% solids was picked up in 30 seconds on a 0.1 sq. ft. leaf from a 7.6% slurry. The cake passed 7.2 displacements of water in a 5 minute wash period.

*Example 4*

The aluminum hydroxide prepared as described in the preceding examples is well suited for use in the manufacture of silica-alumina cracking catalysts. In a typical instance an aluminum hydroxide slurry was prepared as described in Example 2 and was filtered on a continuous rotary filter and washed with sufficient water to give a displacement of two to three times. The filter cake, which was about ¾ inch in thickness, was repulped with fresh water to a 7.5% slurry and again filtered and washed. After the second filtration and washing the sodium content was less than 0.03% calculated as $Na_2O$.

A slurry of gelatinous silica was prepared by adding 25% sulfuric acid to a dilute sodium silicate solution with vigorous agitation, aging and flocculating the slurry and filtering and washing free from alkali metal salts, as described in U. S. Patent No. 2,478,519. The filter cake was suspended in water to a 5% solids content. To 2,000 parts by weight of this slurry there was added 200 parts of the sodium-free aluminum hydroxide filter cake described above, having a solids content of 12.5%, with thorough agitation to form a uniform mixture. The resulting slurry was dewatered on a rotary filter and the filter cake was calcined in a rotary kiln by countercurrent contact with a stream of hot products of combustion entering at 1200–1400° F. for about 30–60 minutes.

The resulting silica-alumina catalyst containing 25% of alumina was found to have high activity for the catalytic cracking of petroleum hydrocarbons. It had particularly good steam stability, as shown by its activity after heating with steam at 1050° F.

The production of catalysts by impregnating the above-described alkali metal-free aluminum hydroxides with promoting catalysts followed by peptizing and drying is claimed in my copending application Serial No. 148,979, filed March 10, 1950.

What I claim is:

1. A method of producing an alkali metal-free aluminum hydroxide which comprises reacting an aqueous alkali metal aluminate solution with a mineral acid by simultaneously discharging separate streams of said aluminate solution and said mineral acid into a reaction vessel while so controlling the rate of discharge of said streams as to maintain the pH of the contents of said reaction vessel between 5.8 and 8.3 during the entire precipitation whereby a filterable slurry of semi-gelatinous aluminum hydroxide is obtained, and then filtering said slurry and washing the filter cake with water until an aluminum hydroxide containing less than 0.1% of alkali metal compound is obtained.

2. A method of producing an alkali metal-free aluminum hydroxide which comprises reacting an aqueous alkali metal aluminate solution with a mineral acid by simultaneously discharging separate streams of said aluminate solution and said mineral acid into a reaction vessel while so controlling the rate of discharge of said streams as to maintain the pH of the contents of said reaction vessel between 5.8 and 8.3 during the entire precipitation whereby a filterable slurry of semi-gelatinous aluminum hydroxide is obtained, filtering said slurry on a continuous rotary filter and washing the resulting filter cake by applying thereto a spray of wash water sufficient to keep the cake wet at all times, said filtering and washing being carried out until an aluminum hydroxide containing less than 0.1% of alkali metal compound is obtained.

3. A method of producing an alkali metal-free aluminum hydroxide which comprises reacting an alkali metal aluminate solution with a mineral acid to form a precipitate of aluminum hydroxide while maintaining the pH of the reaction mixture between 5.8 and 8.3 during the entire precipitation so that all of said aluminum hydroxide is precipitated within said pH range between 5.8 and 8.3 and is thereby formed in an easily filterable and washable condition and then filtering the resulting slurry of aluminum hydroxide and washing the filter cake with water until an aluminum hydroxide containing less than 0.1% of alkali metal compound is obtained.

4. A method according to claim 3 in which the pH is maintained between 6.0 and 7.5 during the entire precipitation.

5. A method of producing an alkali metal-free aluminum hydroxide which comprises reacting an alkali metal aluminate solution with a mineral acid to form a precipitate of aluminum hydroxide while maintaining the pH of the reaction mixture between 5.8 and 8.3 during the entire precipitation so that all of said aluminum hydroxide is precipitated within said pH range between 5.8 and 8.3 and is thereby formed in an easily filterable and washable condition, filtering the resulting slurry at a solids content of 5–10% on a continuous rotary filter and maintaining the filter cake on said filter wet by a continuous spray of wash water, repulping the filter cake from said filter in water and adjusting the solids content of the resulting slurry to 5–10% and filtering the slurry and again washing the filter cake with water to an alkali metal salt content of less than 0.1%.

KENNETH D. ASHLEY.

References Cited in the file of this patent

UNITED STATES PATENTS

| Number | Name | Date |
|---|---|---|
| 1,858,165 | McAdoo | May 10, 1932 |
| 2,120,840 | McCullough | June 14, 1938 |
| 2,137,638 | Sondern | Nov. 22, 1938 |
| 2,247,624 | Wall | July 1, 1941 |
| 2,351,941 | Dyckerhoff | June 20, 1944 |
| 2,406,420 | Weiser et al. | Aug. 27, 1946 |
| 2,423,947 | Pitzer | July 15, 1947 |
| 2,487,076 | Sharp | Nov. 8, 1949 |
| 2,549,549 | Wall | Apr. 7, 1951 |

OTHER REFERENCES

Edwards et al., "The Aluminum Industry," vol. 1, pages 161 and 163, 1930, McGraw-Hill Book Co., New York.